US008015562B2

(12) United States Patent
Cibrario Bertolotti et al.

(10) Patent No.: US 8,015,562 B2
(45) Date of Patent: Sep. 6, 2011

(54) PROCESS FOR MANAGING VIRTUAL MACHINES IN A PHYSICAL PROCESSING MACHINE, CORRESPONDING PROCESSOR SYSTEM AND COMPUTER PROGRAM PRODUCT THEREFOR

(75) Inventors: Ivan Cibrario Bertolotti, Turin (IT); Wolfgang Johann Betz, Agrate Brianza (IT)

(73) Assignees: STMicroelectronics S.r.l., Agrate Brianza (IT); Consiglio Nazionale Delle Ricerche, Turin (IT)

( * ) Notice: Subject to any disclaimer, the term of this patent is extended or adjusted under 35 U.S.C. 154(b) by 1263 days.

(21) Appl. No.: 11/293,037

(22) Filed: Dec. 1, 2005

(65) Prior Publication Data

US 2006/0123416 A1    Jun. 8, 2006

(30) Foreign Application Priority Data

Dec. 3, 2004   (EP) .................................... 04028662

(51) Int. Cl.
*G06F 9/455* (2006.01)
(52) U.S. Cl. .......................................................... 718/1
(58) Field of Classification Search ...................... 718/1
See application file for complete search history.

(56) References Cited

U.S. PATENT DOCUMENTS

| | | | | |
|---|---|---|---|---|
| 4,812,967 A * | 3/1989 | Hirosawa et al. | ............. | 710/269 |
| 6,496,847 B1 * | 12/2002 | Bugnion et al. | ................... | 718/1 |
| 6,961,806 B1 * | 11/2005 | Agesen et al. | .................... | 711/6 |
| 7,035,963 B2 * | 4/2006 | Neiger et al. | ..................... | 711/6 |
| 7,433,951 B1 * | 10/2008 | Waldspurger | ................ | 709/226 |
| 2005/0076186 A1 * | 4/2005 | Traut | ................. | 712/1 |
| 2005/0289542 A1 * | 12/2005 | Uhlig et al. | ....................... | 718/1 |
| 2006/0026577 A1 * | 2/2006 | Dinechin et al. | ............. | 717/148 |
| 2006/0130060 A1 * | 6/2006 | Anderson et al. | ................. | 718/1 |
| 2006/0200820 A1 * | 9/2006 | Cherkasova et al. | ............. | 718/1 |

FOREIGN PATENT DOCUMENTS

WO    WO 02/052404 A2    7/2002

OTHER PUBLICATIONS

European Search Report EP 04 02 8662; Mar. 31, 2005.
Hall, et al. "Virtualizing the VAX Architecture"; Computer Architecture News USA; ACM; May 1991; pp. 380-389; vol. 19, No. 3.
Bugnion, et al. "Disco: Running Commodity Operating Systems on Scalable Multiprocessors"; ACM Transactions on Computer Systems, Association for Computing Machinery; Nov. 1997; pp. 412-447; vol. 15, No. 4; New York, US.
Barham, et al. "Xen and the Art of Virtualization"; Operating Systems Review ACM USA; Dec. 2003; pp. 164-177; vol. 37, No. 5.

(Continued)

*Primary Examiner* — Emerson C Puente
*Assistant Examiner* — Adam Lee
(74) *Attorney, Agent, or Firm* — William J. Kubida; Peter J. Meza; Hogan Lovells US LLP

(57) ABSTRACT

A process for managing virtual machines in a physical machine includes the generation of virtual machines and executing operating systems in the virtual machines on top of the physical machine. A virtual machine monitoring function includes the operations of running in privileged mode, operating multiprogramming functions and providing a plurality of virtual machines identical to the physical machine for executing the operating systems.

17 Claims, 4 Drawing Sheets

OTHER PUBLICATIONS

Sugarman, et al. "Virtualizing I/O Devices on VMware Workstation's Hosted Virtual Machine Monitor"; Proceedings of the 2001 Usenix Annual Technical Conference Usenix Association; Jun. 2001; pp. 1-14; Berkley, CA, US.

Shriver, et al. "An Implementation Scheme for a Virtual Machine Monitor to be Realized on User—Microprogrammable Minicomputers"; ACM Press; Retrieved from the Internet http://portal.acm.org/citation.cfm?id=805585; 1976.

R.A. Meyer, et al., *A Virtual Machine Time-Sharing System*, IBM Systems Journal, vol. 9, No. 3, pp. 199-218, © 1970.

T. Garfinkel, et al, Terra: *A Vertual Machine-Based Platform for Trusted Computing*, Proc. 19$^{th}$ ACM Symp. Operating System Principles, Oct. 2003.

M. Barabanov, et al., *Introducing Real-Time Linux*, Linux J., Feb. 1997.

E. Bugnion, et al., *Disco: Running Commodity Operating Systems on Scalable Multiprocessors*, Proc. 19$^{th}$ ACM Symp. Operating System Principles, Oct. 2003.

\* cited by examiner

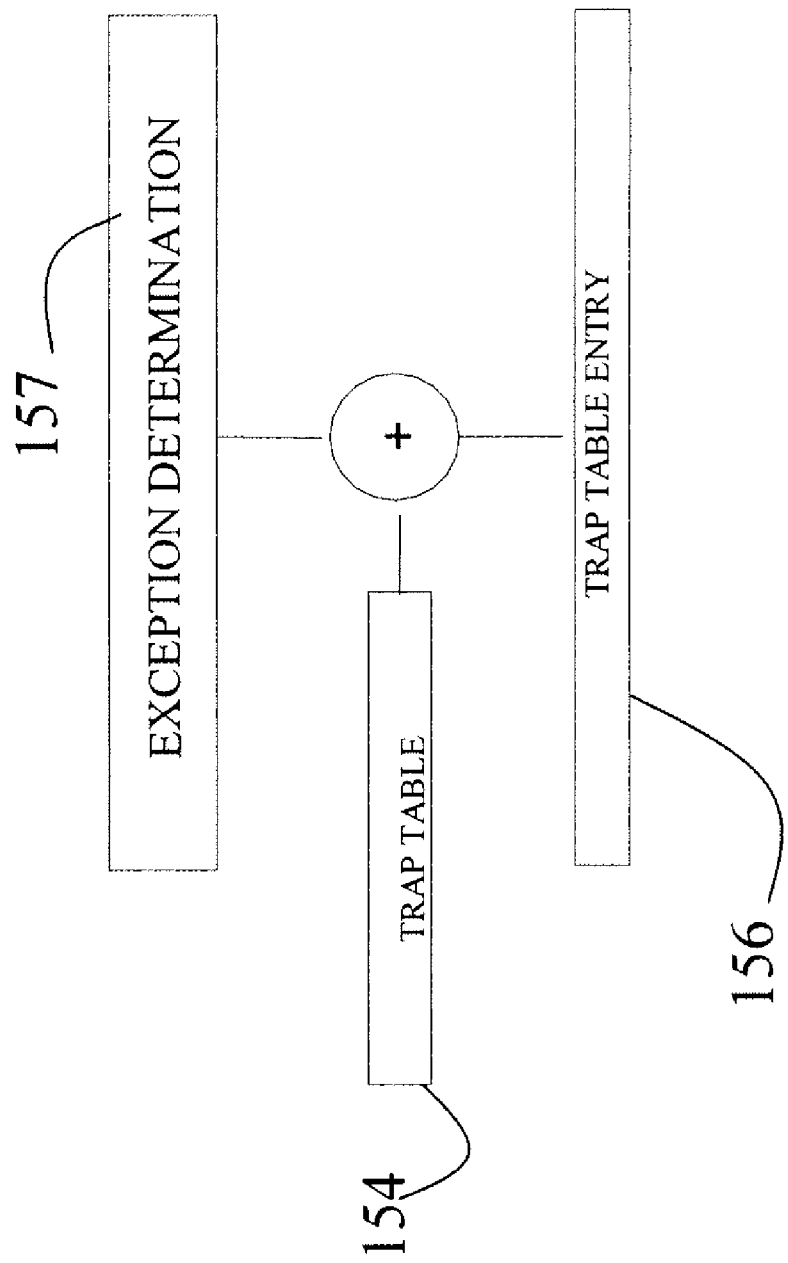

PROCESS FOR MANAGING VIRTUAL MACHINES IN A PHYSICAL PROCESSING MACHINE, CORRESPONDING PROCESSOR SYSTEM AND COMPUTER PROGRAM PRODUCT THEREFOR

RELATED APPLICATION

The present application claims priority of European Patent Application No. 04028662.7, filed Dec. 3, 2004, which is incorporated herein in its entirety by this reference.

FIELD OF THE INVENTION

The present invention relates to processors and methods for executing more than one operating system in said processors.

BACKGROUND OF THE INVENTION

The natural evolution of interactive, mobile appliances with multimedia capabilities brings them towards the integration of applications traditionally developed for the desktop environment (e.g. electronic mail, word processor, web browser) with applications characterized by very different requirements in terms of real-time capabilities (e.g. audio and video coding and decoding for television and/or mobile video telephony) and security (e.g. e-commerce).

To deploy and support desktop applications, the most appealing approach is to adopt a general-purpose operating system, in order to leverage the large amount of code already available for those operating systems, the good availability of software development tools for them, and the widespread expertise programmers have in using them.

On the other hand, general-purpose operating systems often are not suitable for the implementation of the second class of applications mentioned above, especially when the power of the CPU (Central Processing Unit) is in scarce supply as a consequence of cost and/or power consumption constraints. For example, to support real-time applications, the natural choice is a special-purpose real-time operating system, either custom-made or commercially acquired.

Therefore, it would be useful to execute more than one operating system on the same physical machine, and run each application on the operating system most suitable for it; unfortunately, the traditional approach to the design and implementation of operating systems relies on the concept that the operating system has full control on the hardware it runs on, so sharing the same hardware among multiple, traditional operating system is impossible by definition.

In FIG. 1 a simple schematic of the layers of a classical architecture of a virtual machine is shown.

A physical machine 10, like for instance a processor, is associated to a software layer called virtual machine monitor 11, which takes complete control of the machine hardware and creates virtual machines 13. Each of such virtual machines 13 behaves like a complete physical machine, that can run an own operating system 14 and own applications 15 through such an operating system 14.

Historically, virtual machine systems had the goal of simplifying the implementation of the operating system itself and did not provide any real-time guarantee. The hardware was taken as-is and the Virtual Machine Monitor (VMM) had to work around its limitations.

This can be readily observed by reading manuals of systems like e.g. VMware Inc, "VMware GSX Server User's Manual" and R. A. Meyer and L. H. Seawright, "A Virtual Machine Time-Sharing System", IBM Systems Journal, Vol. 9, No. 3, pp. 199-218, 1970. The VMware software, for example, although providing the ability to run multiple operating system, each in its own virtual machine on a single physical computer, suffers the drawbacks of a not perfect virtualization since input/output device drivers have to be rewritten and input/output operations are performed by a dedicated application server supported by one of the guest operating systems. Further VMware is not developed in a coordinated matter with respect to the hardware and no attention is paid to the real-time characteristics of the virtual machines. Since the publication T. Garfinkel, B. Plaff, J. Chow, M. Rosenblum, D. Boneh, "Terra: A Virtual Machine-Based Platform for Trusted Computing", Proc. 19th ACM Symp. Operating Sys. Principles, October 2003, describes a system based on the VMware virtualization engine, it suffers from the same shortcomings already described for VMware.

More recent attempts to integrate real-time tasks and a general-purpose operating system are depicted for instance in M. Barabanov, and V. Yodaiken, "Real-time Linux", Linux Journal, February 1997, where it is described an architecture that provides for nesting a custom real-time microkernel under a general-purpose operating system kernel. The latter requires modifications, so one should ideally have access to its source code; moreover, it is not possible to run a commercially available real-time operating system.

Existing virtual machine systems thus do not provide perfect CPU virtualization, so an off-the-shelf operating system will not run inside a virtual machine unless modified to this purpose; moreover, these systems offer no real-time guarantees and concentrate instead on processor sharing and trusted computing. An example of this can be found for instance in P. Barham, B. Dragovic, K. Fraser, S. Hand, T. Harris, A. Ho, R. Neugerbauer, I. Pratt, A. Warfield, "Xen and the Art of Virtualization", Proc. 19th ACM Symp. Operating Sys. Principles, October 2003. In such a document it is described an imperfect virtualization of an x86 machine that requires modifications to the operating system in order to run it on the virtual machine. In the publication E. Bugnion, S. Devine, M. Rosenblum "Disco: Running Commodity Operating Systems on Scalable Multiprocessors", Proc. 16th ACM Symp. Operating Sys. Principles, October 1997 it is depicted a system aimed to run a commodity operating system on scalable multiprocessor machines by implementing a more conventional, virtual architecture over them. Also in this case, the operating system (IRIX) needs to be modified.

U.S. Pat. No. 4,975,836 describes a hardware-oriented implementation of virtual machines for small processors aimed at minimizing the overhead associated with the virtualization process. The system there disclosed provided for multiple instances of the CPU general register bank, one instance for each virtual machine plus one instance for the virtual machine monitor. Also multiple instances of the CPU status register are provided, along with a hardware mechanism to reflect them into the status register obeyed by the hardware. Finally, an interrupt priority/mask mechanism is provided. Such an approach requires extensive modifications to the hardware; hence, it is difficult to integrate into an existing hardware design.

What is desired is a solution capable of overcoming the drawbacks with the prior art solution described above.

SUMMARY OF THE INVENTION

According to an embodiment of the present invention a process for managing virtual machines in a physical processing machine, corresponding processor system and computer program product therefore enables execution of more than one operating system, without any modification to their source codes, on the same physical machine, as well as running each application on the operating system that is most suitable for running it.

The above is achieved, while at the same time allowing time sharing of the hardware among such more than one operating systems and allowing real-time performance.

The method according to the present invention makes it possible to provide a physical machine in which more than one operating system is run in a respective virtual machine, by exploiting a virtual machine monitoring function, running in privileged mode and intercepting, then either emulating or redirecting to the respective guest operating system running in a virtual machine, exceptions, traps, and interrupts.

According to an embodiment of the present invention, a corresponding processor system is configured to operate the method of the present invention, and a corresponding computer program product directly loadable in the memory of a digital computer and comprising software code portions performs the method of the invention when the product is run on a computer.

BRIEF DESCRIPTION OF THE DRAWINGS

The invention will now be described, purely by way of non-limiting example, with reference to the attached drawings, in which:

FIG. 4 illustrates in the form of a block diagram a detail of a processor that is able to operate according to an embodiment of the invention.

DETAILED DESCRIPTION OF PREFERRED EMBODIMENTS

Figure 1:
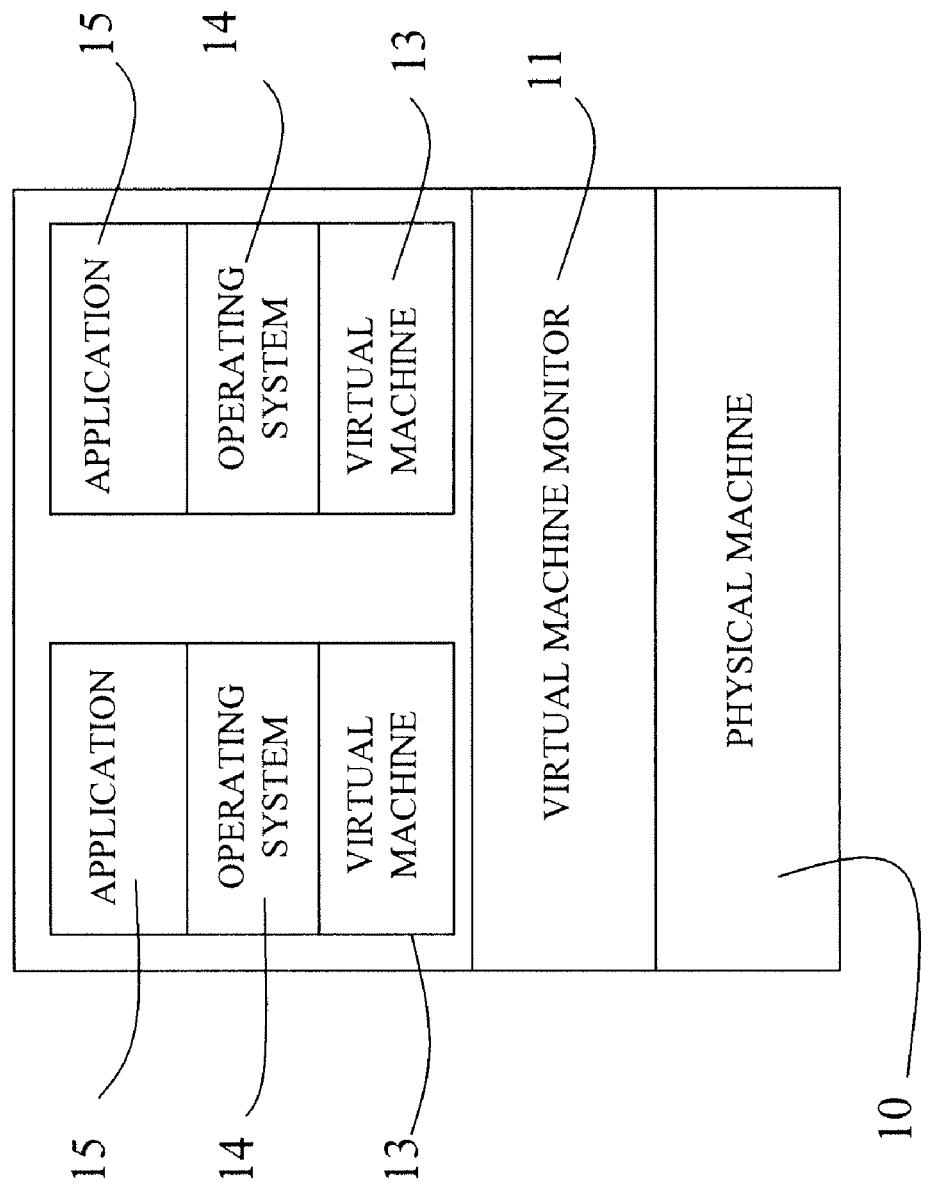
FIG. 1 is a diagram of a virtual machine architecture according to the prior art.
Figure 2:
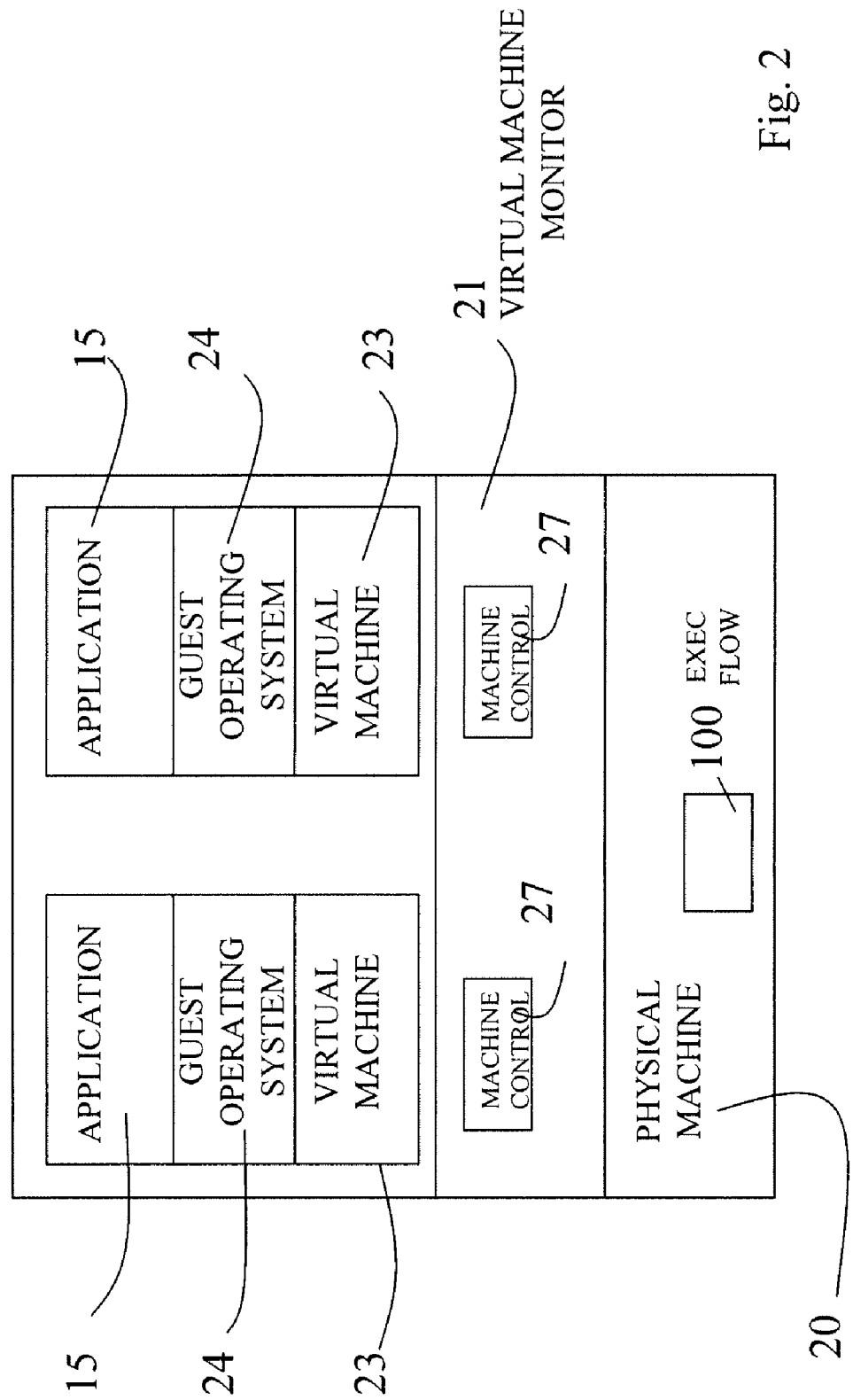
FIG. 2 is a diagram that illustrates layers of processor architecture according to an embodiment of the invention.

The present invention is based upon the recognition that for the layout of a system based on virtual machines an operating system ideally implements two essential functions including multiprogramming and system services In an embodiment of the invention, which is shown in FIG. 2, a system fully separates these functions and implements them as two distinct components.

A virtual machine monitor 21 that runs in privileged mode on the physical machine 20 or processor; such a virtual machine monitor 21 can be either a firmware or software component and does multiprogramming, providing many virtual machines 23 identical in all respects to the physical machine on which the virtual machine monitor 21 runs on. In addition, the virtual machine monitor 21 implements basic synchronization and communication mechanisms between the virtual machines 23 that it provides, and partitions system resources between such virtual machines 23. Such synchronization/communication mechanisms are mechanisms by which distinct virtual machines are allowed to exchange data and timing information, in order to cooperate in carrying out a particular task. For example, a real-time virtual machine hosting a GSM codec and network interface is ideally able to synchronize and communicate with a non-real-time virtual machine hosting the corresponding user interface. The resource partitioning is a mechanism by which the resources of the physical machine (like processors, memory, input/output devices) are assigned to, and divided among, the virtual machines. This is useful, for example, to determine whether, and in which way, a virtual machine can access each resource in the system, and then to enforce such a policy.

A guest operating system 24 runs on each virtual machine and implements system services. Different virtual machines 23 can, and this usually happens, run different operating systems 24; moreover, it should be noted that the guest operating system 24 is ideally not necessarily aware of being run in a virtual machine 23.

The virtual machine monitor 21 maintains a virtual machine control block 27 for each virtual machine 23.

In the approach to virtual machine implementation based on privileged instruction emulation, when an application program 15 performs a system call instruction, the virtual machine monitor 21 intercepts such a system call instruction and redirects it to the guest operating system 24 running in its own virtual machine 23.

According to another aspect of the invention, further, to the guest operating system 24 is given information as running in privileged mode, while the physical machine processor 20 actually continues to operate in user mode. In this way, the virtual machine monitor 21 is able in an execution flow procedure 100 implemented in the physical machine 20 to intercept all privileged instructions issued by the guest operating system 24, check them against the security policy of the system and then perform them on behalf of the guest operating system 24, i.e. emulate them.

An interrupt handling procedure is implemented in a similar way: the virtual machine monitor 21 catches all interrupt requests and then redirects them to the appropriate guest operating system handler, reverting to user mode at the end of this procedure; thus, the virtual machine monitor 21 can intercept all privileged instructions issued by the guest interrupt handler, and again emulate them as appropriate.

Now the features required by the physical machine 20, i.e. a processor or CPU, according to the proposed method for managing virtual machines in a processor will be described.

The implementation of virtual machines requires hardware assistance, both to make it feasible and to be able to emulate privileged instructions with a reasonable degree of efficiency. In order to obtain this, according to the proposed solution, privileged instruction traps are provided that are non destructive with respect to the processor state, and such traps are actually taken on any attempt to access the privileged processor state from user mode, including read-only accesses.

Some considerations about the operation of a physical machine are here below supplied in order to better understand the above outlined solution.

The execution of each machine instruction both depends on, and affects the internal processor state. In addition, the semantics of an instruction depend on the processor or execution mode, also called user/privileged mode, the processor was in when the instruction itself was executed.

For example, the execution of the instruction ADD R13, R13, #1 increments by one the contents of register R13. If R13 is a banked register, the instance of R13 the instruction actually reads and writes depends on the execution mode: if the processor is running in user mode, the user-mode instance of R13 will be updated, and the privileged-mode instance of the same register will not be affected.

The outcome of the instruction BEQ label depends on the current value of the processor state flag Z, and conditionally updates the contents of the program counter.

The view that machine code has of the internal processor state depends thus on the execution mode the processor is running at. In particular, two, somewhat simplified, views of the processor state can identified.

User-mode view is the portion of the processor state that is accessible through machine instructions, with either read-only or read-write access rights, when the processor is in user mode. In other words, it is the portion of the processor state that can be accessed by unprivileged machine instructions;

Privileged-mode view is the portion of the processor state that is accessible through machine instructions, with either read-only or read-write access rights, when the processor is in privileged mode. It usually is a superset of the user-mode state and, if the processor supports a single privileged mode, coincides with full access to the processor state as a whole.

When the processor supports either privilege rings (levels), or multiple, independent privileged modes, the definition of privileged-mode view becomes more complicated, and involves either a nested set of views when the processor supports privilege rings or a collection of independent views when the processor supports multiple, independent privileged modes.

In the case of nested set of views when the processor supports privilege rings the inner view, corresponding to the most privileged processor mode, encompasses the machine state as a whole with the most powerful access rights; outer, less privileged modes have more restricted views of the processor state. Above, nested means that the outer view either has no visibility of a processor state item that is visible from the inner view, or that the outer view has less powerful access rights than the inner view on one or more processor state items.

In the case of a collection of independent views when the processor supports multiple, independent privileged modes it should be noted that the intersection among views can, and usually is, non-empty. It should be noted also that only the union of all views gives full access to the processor state: in general, no individual view can do the same, not even the view corresponding to the "most privileged" execution mode.

As customary, a 'process' is defined as the activity of executing a program; a process therefore encompasses both the program image and a view of the current processor state when the execution takes place. The latter includes the notion of execution progress that could be captured, for example, by a program counter.

Then, it can be traced a distinction among three classes of instructions.

The first class of instructions collects all unprivileged instructions that act on, and depend on, the current view of the processor state only, and can therefore be executed directly by the physical processor with no overhead in a virtual machine setting.

The second class of instructions gathers all privileged instructions that typically act and/or depend on one of the privileged views of the processor state besides the current view. Thus, when the execution of a privileged instruction is attempted in physical user mode, the physical processor should ideally take a trap in order to enable its emulation by the virtual machine monitor.

The third class of instructions includes all instructions that, albeit unprivileged, have an outcome that depends on a physical processor state item belonging to a privileged processor state view, and not to the current view.

The third and last class of instructions is anomalous and problematic in nature from the point of view of processor virtualization, because these instructions allow a program to infer something about a processor state item that would not be accessible from its current view of the processor state itself.

The presence of instructions of this kind hampers the partial instruction emulation approach to processor virtualization just discussed, because this approach is based on the separation between physical processor state and virtual processor state, and enforces this separation by trapping (and then emulating in the virtual processor context) all instructions that try to access privileged processor state views.

Instructions of this kind are able to bypass this mechanism as a whole, because they generate no trap, so the virtual machine monitor would be unable to detect and emulate them; instead, they take information directly from the physical processor state. Therefore, such instructions should ideally be avoided.

Based on the above considerations, in summary, the physical machine 20 for implementing the proposed method and obtaining a proper and efficient virtualization includes the following features.

All privileged instructions generate a trap when executed in unprivileged mode, and all such instructions can be either emulated or restarted without corrupting the processor state.

No unprivileged instruction depends on a physical processor state item belonging to a privileged processor state view for its outcome.

In order to allow the virtual machine monitor 21 to intercept all traps generated by the physical processor, and all interrupt requests from input/output devices, the physical machine 20 is ideally able to relocate its exception vector table anywhere in the addressing space. To this purpose, the physical machine 20 can define, for example, a privileged register (i.e. Trap Table Base Register 154) that, at each instant, holds the virtual base address of such exception vector table.

Figure 3:
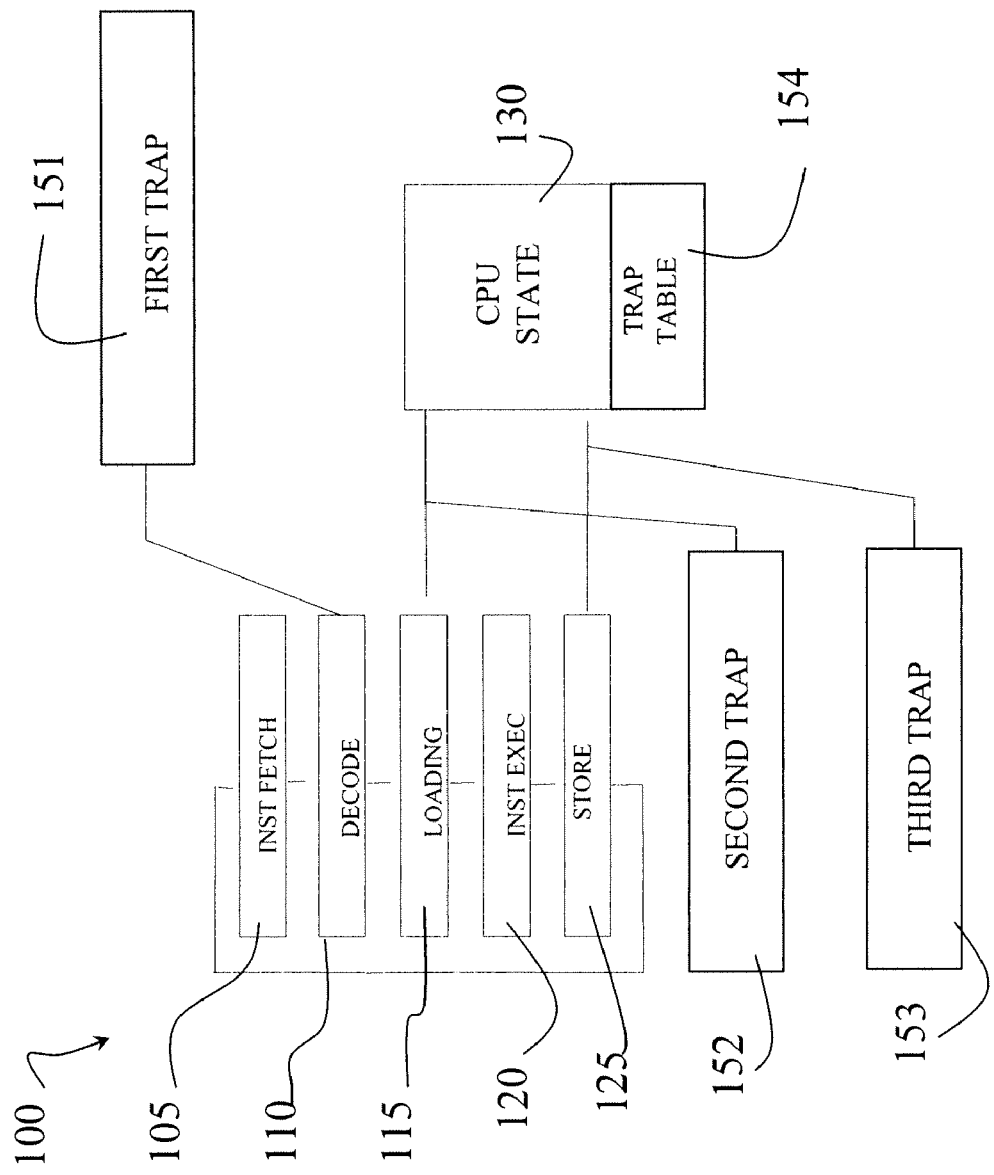
FIG. 3 illustrates, in the form of a flow diagram, the instruction execution flow in a processor that is able to operate according to an embodiment of the invention.

In FIG. 3 a flow diagram is illustrated, that shows a typical instruction execution flow 100 in a physical machine, such as, for instance, a RISC CPU.

A block 105 represents an operation of instruction fetch in the physical machine 10, then the control is passed to an instruction decode block 110, which interprets the instruction. Once the instruction is decoded, an operation of loading of the operands is carried out in a block 115. An instruction execution operation is then performed in a following block 120 and result of the instruction execution 120 is stored in a store result operation represented by block 125.

The load operands operation 115 is performed by obtaining operands from a CPU state information 130, pertaining to the state of the processor, and the store result operation 125 updates such a CPU state information 130 with its output. The control is finally brought back to the instruction fetch operation 105 at the beginning of the instruction execution flow 100.

According to the method of the present invention a first trap 151 is set at the level of the instruction decode block 110. Such a first trap 151 is triggered when attempting to execute a privileged instruction with the processor in unprivileged mode.

A second trap 152 is set at the load operand 115 level, when attempting to load privileged state information from the CPU state information 130 with the processor in unprivileged mode.

A third trap 153 is set at the store result operation 125 level, when attempting to store in the CPU state information 130 privileged state information with the processor in unprivileged mode.

Further, a suitable privileged register, the Trap Table Base Register 154 is added to the CPU State Information 130.

The first trap 151, second trap 152 and the third trap 153, in association with the Trap Table Base Register 154 correspond to the modifications suitable for implementing the virtualization in the physical machine.

To make use of the Trap Table Base Register 154, the portion of hardware/firmware that computes the exception vector should be modified, too, as depicted in FIG. 4.

In FIG. 4 the output of the Trap Table Base Register 154, i.e. the address of the trap table, is combined with the output of a block 157, in which is performed an operation of determining the reason of the exception along with a corresponding index in the trap table.

The result of the summation is a virtual address of the trap table entry 156.

Now the features required by firmware associated to the virtual machine monitor 21 will be described.

To perform its functions, the virtual machine monitor 21 maintains a virtual machine control block 27 for each virtual machine 23. The virtual machine control block 27 is a data structure that holds the full machine state, for each execution mode, of a virtual machine 23; therefore such virtual machine control block 27 contains, among other things, state information belonging to, and accessible from, distinct views of the processor state, with different levels of privilege.

When a virtual machine 23 is being executed by a physical processor 20, the virtual machine monitor 21 transfers part of the virtual machine control block 27 into the physical processor state; when the virtual machine monitor 21 assigns the physical processor 20 to another virtual machine 23, the physical processor state is transferred back into the virtual machine control block 27.

It is important to notice that virtual machines 23 are always executed with the physical processor 20 in user mode, regardless of the virtual processor mode. Most virtual machine instructions are executed directly by the physical processor 20, with zero overhead; however, some instructions should be emulated by the virtual machine monitor 21 and incur a trap handling overhead.

As outlined in the following TABLE 1, which contains trap types as a function of the virtual machine mode, the virtual machine monitor 21 should be able to receive and handle traps on behalf of a virtual machine 23, and these traps can be triggered for a variety of reasons. When using the privileged instruction emulation approach to processor virtualization, the most common reason for a trap is the request to emulate a privileged instruction; this situation is labelled as "Emulation" in TABLE 1.

TABLE 1

| | Trap Type | |
|---|---|---|
| Virtual Mode | Privileged Instruction | Other |
| User | Exception | Exception/Syscall |
| Privileged | Emulation | Exception/Cross-domain call |

The virtual machine monitor 21 performs privileged instruction emulation when a virtual machine 23 attempts to execute a legal privileged instruction while in virtual privileged mode; legal, in this context, means that the instruction does not trigger traps other than the privileged instruction trap. In this case, the physical processor 20 (running in physical user mode) takes a "privileged instruction" trap that would have not been taken if it were in physical privileged mode as the virtual machine guest code, that is, guest operating system and guest applications, expects it to be.

The main steps of the instruction emulation sequence are as follows.

Save into the virtual machine control block 27 all registers in the view corresponding to the current virtual processor mode. Such a saving operation both "freezes" the virtual machine state for subsequent instruction emulation, and frees the physical processor state for the use of the virtual machine monitor 21.

Locate and decode the instruction to be emulated in the instruction stream currently being executed inside the virtual machine 23. This operation may involve multiple steps because, for example on a superscalar or deeply pipelined architecture, the exact value of the program counter at the time of the trap might not be easy to compute.

Switch the physical machine 20 into the appropriate privileged mode for instruction emulation, that is, to the privileged execution mode of the virtual machine 23. The trap handling mechanism of the physical machine always switches the processor into a privileged mode but, if the physical machine 20 supports multiple privileged modes, that execution mode might not coincide with the actual execution mode of the virtual machine 23.

Emulate the instruction using the virtual machine control block 27 as the reference machine state for the emulation, and reflecting its outcome into the virtual machine control block 27 itself. Notice that the execution of a privileged instruction may update both the privileged and the unprivileged portion of the virtual machine state, so the virtual machine control block 27 as a whole is involved. Also, the execution of a privileged instruction may change the execution mode of the virtual machine.

Update the virtual program counter in the virtual machine control block 27 to the next instruction in the instruction stream of the virtual machine 23.

Restore the virtual machine state from the updated virtual machine control block 27 and return from the trap. The restoration of the virtual machine state is accomplished by copying a portion of the virtual machine control block into the physical processor registers.

In the last step above, the virtual machine state can in principle be restored from the virtual machine control block 27 of the virtual machine that generated the trap in the first place, if the scheduler of the virtual machine monitor is not invoked after instruction emulation; this is the case just described.

The virtual machine state can also be restored from the virtual machine control block 27 of another virtual machine 23, if the scheduler of the virtual machine monitor is invoked after instruction emulation.

When an exception, other than a privileged instruction trap, occurs in both virtual user and virtual privileged modes, the virtual machine monitor 21, and not the guest operating system 24 of the virtual machine 23, receives the trap in the first place. Since this kind of traps is not instrumental to the implementation of virtual machines, the virtual machine monitor 21 should simply imitate the trap mechanism itself inside the virtual machine 23, and appropriately update the virtual machine control block 27 to reflect the trap back to the privileged virtual machine code. The cases in which exception emulation—as just described—should be carried out are marked as "Exception" in table 1.

A special case of exception, labelled as "Syscall" in table 1, is the exception generated by the system call instruction, while a "Cross-domain call" is an exception generated by the instruction (e.g. a software interrupt) used for performing cross-domain calls internal to the guest operating system. From the point of view of the virtual machine monitor 21, this kind of exceptions is handled exactly as all the others; only the interpretation given to the exception by the virtual machine guest code is different.

To discuss interrupt handling, it is distinguished between three kinds of interrupt; each of them requires a different handling strategy by the virtual machine monitor 21.

Interrupts set up by, and destined to, the virtual machine monitor 21 itself. For example the time slice interrupt of the scheduler of the virtual machine monitor 21, and the virtual machine monitor 21 console interrupt; in this case, no virtual machine ever notices the interrupt.

Interrupts destined to a single virtual machine, for example a disk interrupt for a physical disk permanently assigned to a virtual machine.

Interrupts synthesized by the virtual machine monitor 21, either by itself or as a consequence of another interrupt, and destined to a virtual machine 23, for example a disk interrupt for a virtual disk emulated by the virtual machine monitor 21, or a network interrupt for a virtual communication channel between virtual machines.

In either case, the general approach to interrupt handling according to the proposed solution is the same, and the delivery of an interrupt request to a virtual machine implies at least the following steps.

If the processor 20 was executing in a virtual machine 23, save the status of the current virtual machine, into the corresponding virtual machine control block 27; then, switch the processor onto the virtual machine monitor 21 context and stack, and select the most privileged processor mode. Else, if the processor 20 was already executing the virtual machine monitor 21, then the processor 20 already is in the virtual machine monitor 21 context and stack, and runs in the right execution mode. In both cases, after this phase, the current virtual machine context has been secured in its virtual machine control block 27 and the physical processor can freely be used by virtual machine monitor code; this is also a good boundary for the transition between the portion of the virtual machine monitor 21 written in assembly code and the bulk of the virtual machine monitor 21, written in an higher level programming language.

Determine the type of interrupt request, and to which virtual machine 23 it should be dispatched, if any; then, if the interrupt request should be actually forwarded to a virtual machine, emulate the interrupt processing normally performed by the physical processor 20 in the corresponding virtual machine control block 27. An additional complication arises if the target virtual machine is the current virtual machine and the virtual machine monitor 21 was in active execution, that is, it was emulating an instruction on behalf of the virtual machine itself, when the request arrived. In this case, the simplest approach, that also adheres the most to the behaviour of the physical processor, is to defer interrupt emulation to the end of the current emulation sequence. To implement the deferred handling mechanism efficiently, some features of the physical processor, such as deferrable software interrupts, may be useful but are not strictly needed.

Return either to the virtual machine monitor 21 or the virtual machine guest code that was being executed when the interrupt request arrived. It should be noticed that, at this point, no actual interrupt handling has taken place yet, and that some devices may require some limited intervention before returning from their interrupt handler, for example, to release their interrupt request line. In this case, it may be necessary to incorporate this low-level interrupt handling in the virtual machine monitor 21 directly, and at the same time ensure that it is idem potent when repeated by the virtual machine interrupt handler.

A problem common to privileged instruction emulation, exception handling and interrupt handling is that the virtual machine monitor 21 should be able to intercept any trap the machine 20 generates while executing on behalf of a virtual machine 23 and direct it towards its own handler.

Most modern processors use a unified trap vector or dispatch table for all kinds of traps, exceptions and interrupts. Each trap type has its own code that is used as an index in the trap table to fetch the address in memory at which the corresponding trap handler starts. A slightly different approach is to execute the instruction inside the table directly (in turn, the instruction will usually be an unconditional jump instruction), but the net effect is the same. A privileged register, usually called the trap table base register, gives the starting address of the table.

In either case, all vectors actually used by the physical processor when handling a trap reside in the privileged address space, and are accessed after the physical processor has been switched into an appropriate privileged mode. The virtual machine monitor should have full control on these vectors, because it relies on them to intercept traps at runtime.

On the other hand, the virtual machine guest code should be able to set its own trap table, with any vectors it desires; the latter table resides in the virtually privileged address space of the virtual machine, and should be accessible to the virtual machine guest code in read and write mode. The content of this table is not used by the physical processor, but by the virtual machine monitor 21 to compute the target address to which redirect traps via emulation.

The simplest approach to accommodate these conflicting needs, when it is not possible to map the same virtual address to multiple, distinct physical addresses depending on the processor mode without software intervention—quite a common restriction on simple Memory Management Units—is to reserve in the addressing space of each virtual machine 23 a page unused by the guest code, grant read access to it when the processor 20 is in physical privileged mode only (to make the page inaccessible when the CPU is running in unprivileged mode), store the virtual machine monitor 21 trap table (to be obeyed by the hardware) there and direct the processor 20 to use it by setting its trap table base register 154 appropriately.

The virtual machine monitor 21 should then intercept any access made by the virtual machine guest code to the trap table base register 154, in order to properly locate the virtual trap table and be able to compute the target address to which redirect traps.

In other words, the availability of a trap table base register 154 allows a proper virtualization, since it allows the guest code to set up its own, virtual trap table, and the virtual machine monitor 21 to set up the trap table obeyed by the physical processor, without resorting to virtual/physical address mapping functions that depend on the processor mode.

In the following an example will be given of the minimum set of extensions that should be implemented in a processor architecture in order to implement the system described with reference to FIGS. 2 and 3, making virtual machines feasible and making their implementation reasonably efficient.

The processor architecture that will be referenced, chosen merely for exemplary purposes, is an ARM V5 processor, that is fully described in D. Seal, editor, "ARM Architecture Reference Manual", Addison-Wesley, ISBN 0 201 737191, Second Edition, 2001, the description there disclosed being here incorporated by reference. Thus in this case the physical machine 20 of FIG. 2 is embodied by the ARM V5 processor.

The extensions affect the exception handling mechanism and the instruction set; moreover, the extensions add some registers to the system control coprocessor.

For what concerns the privileged instruction trap, the exception handling mechanism, as mentioned above, is extended to comprise a new kind of exception, namely a "privileged instruction" exception, and the ability to relocate the base of the ARM exception table by means of the Exception Table Based Register (ETBR) privileged register, as better detailed further in the description. Such an ETBR privileged register corresponds the Trap Table Base Register 154 previously mentioned in the describing the general solution.

The ARM processor should take a privileged instruction trap, and switch to supervisor mode in the process, whenever the execution of a privileged instruction in user mode is attempted and the architectural extensions described here are enabled; in other part of the description will be detailed which instructions can trigger a privileged instruction trap and when, and how to enable the architectural extension.

Since the ARM architecture specification explicitly stipulates that the Fast Interrupt (fiq mode) exception handler, at offset 0x1C, can overflow into the vector entries that follow it, it is not advisable to introduce a new exception vector with a higher offset. Thus, in the implementation here described the privileged instruction trap will be assigned to offset 0x14; this offset, albeit assigned to the Address Exception in earlier versions of the architecture, is unused in version 5 of the architecture. When the privileged instruction exception is taken, the processor performs the following actions.

The Link Register of the supervisor mode (R14_svc) is set to the address of the next instruction after the instruction that triggered the trap; the Saved Processor State Register of the supervisor mode (SPSR_svc) is set to the CPSR (Current Program Status Register); the processor enters supervisor mode; and the program counter is set to the current value of the ETBR register plus the privileged instruction offset 0x14.

In the implementation presently described by way of example, associated with the privileged instruction trap there is a new privileged register, the Privilege Violation Reason Register (PVRR) which conveys the exact reason of a privileged instruction trap by means of a reason code. At any time, its contents are related to the last privileged instruction trap taken by the processor.

Such PVRR register can be accessed through the system control coprocessor (CP15) register 4 that is marked as reserved in version 5 of the ARM architecture reference manual, with both opcode_1 and opcode_2 set to zero. Being privileged, the PVRR register can be accessed only when the CPU is in a privileged mode. For example, the assembler instruction:

mrc p15, 0, r2, cr4, cr0 reads the current value of the PVRR register into r2, provided that the processor is running in privileged mode. Otherwise, the processor takes a privileged instruction trap as described above.

The following TABLE 2 shows the bit assignments in the PVRR register. The first column represents the Bit range and the second column the associated meaning of the assignment.

TABLE 2

| Bit Range # | Meaning |
| --- | --- |
| 0-2 | Instruction decoding variant |
| 3 | Read/Write, CPU-centric |
| 4-7 | Class of offending instruction |
| 8-31 | Reserved |

TABLE 3 lists the currently defined Privilege Violation Reason Codes. The first column contains the reason (i.e., the instruction originating the exception) and the indication of the ARM V5 instruction class and the second column contains the corresponding code:

TABLE 3

| Reason | Code |
| --- | --- |
| DP Instruction (ARM V5 Data Processing Instructions) with S modifier and R15 as destination | 0x00000001 |
| CPSR register read (ARM V5 Status Register Access Instructions) | 0x00000011 |
| SPSR register read (ARM V5 Status Register Access Instructions) | 0x00000013 |
| CPSR register write, register op. (ARM V5 Status Register Access Instructions) | 0x00000019 |
| SPSR register write, register op. (ARM V5 Status Register Access Instructions) | 0x0000001B |
| CPSR register write, immediate op. (ARM V5 Status Register Access Instructions) | 0x0000001D |
| SPSR register write, immediate op. (ARM V5 Status Register Access Instructions) | 0x0000001F |
| LDM user mode register (ARM V5 Multiple Load and Store Instructions) | 0x00000021 |
| LDM PC and CPSR (ARM V5 Multiple Load and Store Instructions) | 0x00000023 |
| STM user mode register (ARM V5 Multiple Load and Store Instructions) | 0x00000029 |
| Coprocessor privileged register read (ARM V5 Coprocessor Instructions) | 0x00000031 |
| Coprocessor privileged register write (ARM V5 Coprocessor Instructions) | 0x00000039 |

TABLE 4 summarizes the new system control processor privileged registers. In the first column of Table 4 is indicated the register, in the second column the name and in the third column the purpose.

TABLE 4

| Register | Name | Purpose |
| --- | --- | --- |
| 4 | PVRR | Privilege Violation Reason |
| 11 | ETBR | Exception Table Base |
| 12 | XER | Architecture Extension Enable |

The PVRR register is set to zero on CPU reset and after each read operation.

For what concerns the Exception Table Base Register (ETBR) the ARM architecture reference manual stipulates that the table holding the exception vectors can be located at either one of two fixed locations in the virtual addressing space, namely 0x00000000 or 0xFFFF0000; the latter location is selected when "high vectors" are enabled.

Instead, to intercept all traps, a virtual machine monitor like the virtual machine monitor 21 described with reference to FIG. 2 should be able to relocate the exception vector table anywhere in the addressing space. To this purpose, the system control coprocessor (CP15) register 11, previously marked as reserved, is now defined as the Exception Table Base Register and contains the virtual base address of the exception vector table. The ETBR register is privileged and can be accessed only when the CPU is in a privileged execution mode; moreover, both opcode_1 and opcode_2 should be set to zero in the access instruction. The CPU uses the contents of this register to locate the exception vector table whenever the extensions to the architecture are enabled, otherwise reverts to the standard table locations.

For backward compatibility, the extensions to the ARM architecture described in the present exemplary embodiment should be disabled by default, and enabled only when a virtual machine monitor 21 is present. To this purpose, the system control coprocessor (CP15) register 12, previously marked as reserved, is now defined as the Extension Enable Register (XER). Writing any non-zero value into the XER register enables the architectural extensions, a zero value disables them; the default value of the XER register is zero. The XER register is privileged and can be accessed only when the CPU is in a privileged execution mode; moreover, both opcode_1 and opcode_2 should be set to zero in the access instruction.

The definition of some instructions should be extended to generate a privileged instruction trap whenever an attempt is made to access/modify privileged information from an unprivileged execution mode. The instructions affected by the extension are as follows.

Data processing instructions with S modifier and R15 as destination register.

Status register access instructions. Both the instructions that read a status register (MRS) and write a status register (MSR) should be modified. Each of these instructions works on either CPSR or SPSR depending on the value of bit R of the instruction. Moreover, the MSR register has two different forms depending on the addressing mode in use (immediate or register operand) So, a total of six different instructions should be modified, thus leading to the six distinct privilege violation reason codes listed in TABLE 3.

Load/Store Multiple, when either loading/storing user mode registers (LDM/STM form 2).

Load Multiple, when loading the program counter PC and the CPSR register (LDM form 3).

Coprocessor access instructions, when accessing a privileged coprocessor register. In particular, all registers of the system control coprocessor (CP15) are privileged and used to trigger an undefined instruction trap when accessed in user mode; now, they trigger a privileged instruction trap instead.

In the presently described exemplary implementation, only the 32-bit architecture is taken into consideration for the instruction set extension. It should also be noted that it is not strictly necessary to take a privileged instruction trap on any attempt to execute the MSR instruction on the CPSR register. In fact, if only bit f is set in the field mask of the MSR instruction, then that instruction only updates the (condition code) flags in the CPSR register, and nothing else. Therefore, it acts on an unprivileged portion of the context, and it is permissible to execute it directly by hardware, without generating any trap.

For what concerns Memory Management Unit extensions, no extensions to the Memory Management Unit defined in the ARM architecture reference manual are contained in the here described exemplary embodiment of the virtual machine monitor 21. However, it is likely that suitable extensions to the Memory Management Unit architecture, for example splitting the unified page tables now in use into separate page tables for unprivileged and privileged accesses respectively, could enhance the performance of the virtualization.

The organization of the Translation Lookaside Buffer (TLB) and of the caches may also affect performance.

In the following some examples of the operation of the ARM processor implementing the proposed process for managing virtual machines will be described.

In describing a general exception handling mechanism, it should be taken in account that in the ARM architecture, exceptions encompass both traps and interrupts; one of the main abilities the virtual machine monitor 21 should have is to intercept all exceptions occurring during the execution of a virtual machine like the virtual machine 23 described with reference to FIG. 2. This ability is useful both to keep full control of the physical machine, and to perform virtualization through the emulation of privileged instructions issued in virtually privileged mode by the virtual machine.

Assuming that the exception occurs while the CPU is executing a virtual machine guest code and noting that any exception taken during the execution of a virtual machine always starts from a physically unprivileged execution mode, the first steps performed by the CPU are described here below; it is important to note that these steps are common to both the standard and the extended ARM architecture.

The CPU starts exception handling by switching to a (physical) privileged mode that depends on the reason of the exception. For example, an interrupt request brings the CPU into the irq privileged mode.

The current program counter and CPSR are saved into the banked registers R14 and SPSR corresponding to the privileged execution mode the CPU is now in.

Depending on the source of the exception, the CPU may carry out some additional actions, such as disabling further interrupt requests.

At this point, the CPU computes the new value of the program counter, that is, the address of the first instruction of the exception handler. The behavior of the enhanced architecture differs from the standard one.

The standard CPU computes the new program counter using an exception table offset which depends on the source of the exception (for example, an interrupt request has offset 0x18) and the base address of the exception table, that can be either 0x00000000 or 0xFFFF0000 depending on the status of the "high vectors" feature.

The extended CPU computes the new program counter summing up a table offset that depends on the source of the exception (and that is the same as in the standard CPU), and the current exception table base, taken from the ETBR register.

In both cases, the CPU then performs a privileged access into the exception table to fetch the next instruction, the first instruction of the exception handler.

When the virtual machine monitor 21 software is present, the ETBR register points to the base of the virtual machine monitor 21 exception table instead of the virtual machine exception table, so the net effect of the first phase of exception handling just described is to transfer control to the virtual machine monitor 21 in privileged mode. In a simple implementation, the virtual machine monitor 21 exception table is located in a page unused by the guest operating system running in the virtual machine, and is granted read/execute access only in privileged mode, so that the page is invisible to the guest operating system, yet it can be accessed during exception handling.

After acquiring control of the machine, the virtual machine monitor 21 ideally performs some housekeeping operations that are common to and required by all kinds of exception handling activities, such as the following.

Reconfigure the Memory Management Unit to use the virtual machine monitor 21 page tables. This action should be performed from a page which will not move, i.e. change virtual address, during the reconfiguration, preferentially the same page that holds the virtual machine monitor 21 exception table. In addition, the TLB buffer is ideally invalidated after the remap.

Save the full CPU context of the virtual machine being executed in the appropriate virtual machine control block 27. In order to preserve some portions of the context before Memory Management Unit reconfiguration, a scratch save may be necessary; again, a good candidate to hold this area is the page that holds the virtual machine monitor 21 exception table, because when following all the above advices and suggestions it remains accessible in both the virtual machine and virtual machine monitor 21 page tables, at the same virtual address.

Take in account that, unlike in traditional operating systems, a portion of the context save operation described above may depend on the virtual execution mode of the virtual machine that caught the exception. For example, if the virtual machine was running in virtual svc mode (and in physical usr mode), the usr mode register R13_usr is ideally saved in the portion of the virtual machine control block 27 destined to R13_svc.

Prepare for the execution of C-language code in the virtual machine monitor 21 context. In turn, this requires switching to the virtual machine monitor 21 stack and appropriate register initialization. In addition, provision is ideally made to propagate to the C-language code all the information available about the exception;

Transfer control to the C-language exception handler in the virtual machine monitor 21. The execution of the exception handler may involve a scheduling operation at the virtual machine monitor 21 processor scheduler level because, for example, an interrupt request may wake a higher-priority virtual machine up. As a consequence, the virtual machine monitor 21 processor scheduler may have to resume execution of another virtual machine after exception handling is completed.

Thus, the general exception handling mechanism ideally makes provision for full virtual machine save/restore before/after exception handling even if some kinds of exception, e.g. privileged instruction emulation, may benefit from an abbreviated and simplified context handling.

Therefore, the actions to be carried out to resume virtual machine execution after exception handling are as follows.

Restore the full CPU context of the virtual machine to be resumed from the appropriate virtual machine control block 27. It is important to note that some portions of the context restoration may need to be delayed until the Memory Management Unit has been reconfigured to the virtual machine page tables, so a scratch save area may be needed.

Reconfigure the Memory Management Unit to use the virtual machine page tables. On most Memory Management Units, this is ideally done with a sequence of instructions fetched from the page holding the exception table, because the instructions should ideally not move in the process.

Give control to the virtual machine and return to physical user mode in the process.

Referring now to an example of privileged instruction emulation, when a virtual machine attempts the execution of a privileged instruction in virtually privileged (but physically unprivileged) mode, the CPU takes a privileged instruction trap intercepted by the virtual machine monitor 21 by means of the general exception handling mechanism described above. The virtual machine monitor 21 then performs the following actions:

With the aid of the PVRR register, determine the reason of the privileged instruction trap.

Locate the privileged instruction that the virtual machine intended to execute by means of the program counter saved in the virtual machine control block 27. It is important to note that the virtual memory access to fetch the instruction is ideally performed using the virtual machine page tables (not the virtual machine monitor 21 ones) and the virtual machine page tables are not active, so the access is ideally emulated by a software walk in the virtual machine page tables.

Emulate the privileged instruction in the virtually privileged context of the virtual machine. This involves the manipulation of the virtual machine control block 27, to increment the saved program counter.

The emulation of the privileged instruction can be the anchor point for virtual machine monitor 21 housekeeping functions. For example, the execution of a TLB buffer flush instruction by a virtual machine should trigger the re-computation of the virtual machine page tables by the virtual machine monitor 21.

The net effect of these actions is to execute the instruction as if the processor were in the privileged execution mode.

As an example of trap propagation operation, when a virtual machine triggers a trap while it is executing in virtually unprivileged mode (usr mode), or when the trap is not related to the execution of a privileged instruction (regardless of the execution mode), the CPU takes the trap and the virtual machine monitor 21 intercepts it by means of the general exception handling mechanism previously described.

Then, the virtual machine monitor 21 ideally propagates the trap to the virtual machine guest operating system by performing the following steps.

Duplicate the effects of the trap in the virtual machine control block 27 of the virtual machine that was currently running.

The previous step includes a change in the virtual execution mode of the virtual machine so that, when resumed, the virtual machine will execute in the virtually privileged execution mode corresponding to the kind of trap just taken.

Also, the change of execution mode requires the recomputation of the unprivileged page table tree that the memory management unit actually obeys when the virtual machine is being executed, to reflect the memory mapping in effect when the virtual machine runs in virtually privileged mode.

The net effect of these operations is to propagate the trap to the privileged guest software of the virtual machine as if the virtual machine monitor 21 were not present at all.

Now it will be described, as an example, how the virtual machine monitor 21 redirects an interrupt request destined to a specific virtual machine; the other cases of kinds of interrupts previously identified with respect to interrupt handling in discussing the general solution are handled similarly.

To redirect an interrupt request to a specific virtual machine the virtual machine monitor 21 ideally performs a sequence of actions very similar to trap redirection in most cases; this is expected, because in the ARM architecture trap and interrupt handling are unified.

The only exception to be considered is the arrival of an interrupt request in concurrency with the execution of the virtual machine monitor 21.

If the interrupt request arrives when the virtual machine to which the request is redirected is not running, the redirection can be performed immediately, because virtual machines are always context switched on instruction boundaries.

If the interrupt request arrives while the virtual machine to which the request is redirected is running, the redirection can be performed immediately, because the hardware mechanism to acknowledge an interrupt request is implicitly synchronized with instruction boundaries.

Unlike the previous cases, if the interrupt request arrives while the virtual machine monitor 21 is executing on behalf of the virtual machine to which the interrupt request is redirected, to emulate a privileged instruction, the redirection cannot be performed immediately, because such a delivery would break the assumption of atomic execution of elementary instructions. In this case, the simplest choice is to delay the delivery of the interrupt request until the virtual machine monitor 21 has completed the emulation. This choice is also very similar to the behaviour of the hardware in the same situation, i.e. when an interrupt request arrives while an instruction is being executed.

Thus from the above description of the proposed solution and examples of its implementations it is apparent that the proposed process and processor system, configured for operating with such a process offer the important advantage provided by the full separation of the two functions described above, i.e. multiprogramming and system services. Such a separation has the advantage of making each system component smaller and easier to maintain. Moreover, the presence of a relatively small, centralized arbiter, the virtual machine monitor, of all interactions between virtual machines makes the enforcement of security policies easier.

The isolation of virtual machines from each other also enhances reliability because, even if one virtual machine fails, it does not bring down the system as a whole. In addition, it is possible to run a distinct operating system in each virtual machine thus supporting, for example, the coexistence between a real-time and a general-purpose operating system.

Of course, without prejudice to the principle of the invention, the details of implementation and the embodiments may be varied as required for a particular implementation with respect to what is described and illustrated herein, without thereby departing from the scope of the present invention, as defined in the annexed claims.

We claim:

1. A process for managing virtual machines comprising:
providing a virtual machine monitoring function running on a physical machine, said virtual machine monitoring function including the operations of:
running in privileged mode;
operating multiprogramming functions;
providing a plurality of said virtual machines identical to said physical machine executing unmodified guest operating systems;
providing said physical machine with privileged instruction traps that do not alter a state of said physical machine, comprising:
allowing all privileged instructions to generate a trap when executed in unprivileged mode;
restricting the use of unprivileged instructions depending on whether a portion of the state of the physical machine belongs to a privileged state view of the physical machine for its outcome; and
allowing the physical machine to relocate its exception vector table anywhere in the addressing space in order to allow said virtual machine monitoring to intercept all traps generated by the physical machine by defining a privileged register, in particular a trap table base register that, at each instant, holds the virtual base address of said exception vector table.

2. The process according to claim 1, wherein said virtual machine monitoring comprises intercepting and redirecting to said guest operating system running in a respective virtual machine system call instructions from application programs.

3. The process according to claim 2, wherein said virtual machine monitoring comprises performing an emulation procedure when executing a privileged instruction in physical unprivileged mode so that said guest operating system operates as if running in privileged mode and said physical machine operates in user mode.

4. The process according to claim 3, wherein said operation of executing virtual machines with the physical machine being in user mode comprises executing at least a part of virtual machine instructions directly through the physical machine and by adopting said emulation procedure in the virtual machine monitor for privileged instructions, with said privileged instructions incurring a trap handling overhead.

5. The process according to claim 4, wherein said emulation procedure comprises:
saving into a virtual machine control block all registers in the view corresponding to the current virtual processor mode;
locating and decoding the instruction to be emulated in the virtual machine instruction stream;
switching the physical machine into the corresponding privileged mode for instruction emulation;
emulating the instruction using the virtual machine control block as a reference machine state, and reflecting an outcome of said emulation into said virtual machine control block itself;
updating a virtual program counter comprised in the virtual machine control block to the next instruction in the instruction stream of the virtual machine; and
restoring the virtual machine state from the updated virtual machine control block and returning from the trap.

6. The process according to claim 1, wherein said virtual machine monitoring comprises intercepting all interrupt requests and then redirecting said interrupt requests to the appropriate guest operating system handler and then reverting to user mode.

7. The process according to claim 6, wherein said operation of intercepting interrupts comprises:
on the arrival of an interrupt request, evaluating if the physical machine is executing guest code in a virtual machine or is already executing the virtual machine monitoring and, if the physical machine is executing in a virtual machine, saving the status of the current virtual machine, into a corresponding virtual machine control block, then switching the physical machine onto virtual machine monitoring and selecting the most privileged processor mode;
determining the type of interrupt request, and to which virtual machine said interrupt request is dispatched, if any, then emulating the interrupt processing normally performed by the physical machine in the corresponding virtual machine control block; and
returning either to said virtual machine monitoring or virtual machine guest code that was being executed when the interrupt request arrived.

8. The process according to claim 6, further comprising the operation of reserving in the addressing space of each virtual machine a page unused by the guest code, granting read access to it when the physical machine is in physical privileged mode only, storing the virtual machine monitor trap table in said page and direct the physical machine to use it by setting its trap table base register appropriately.

9. The process according to claim 1, wherein said instruction traps comprise:
a first trap set at the level of an instruction decode operation, triggered when attempting to execute a privileged instruction with the physical machine in unprivileged mode;
a second trap set at the level of a load operand operation, triggered when attempting to load privileged state information from a physical machine state information with said physical machine in unprivileged mode; and
a third trap set at the level of a store result operation, triggered when attempting to store in the physical machine state information privileged state information with the physical machine in unprivileged mode.

10. The process according to claim 1, wherein said virtual machine monitoring further comprises maintaining a virtual machine control block for each virtual machine, said virtual machine control block holding a full machine state, for each execution mode, of the corresponding virtual machine.

11. The process according to claim 1, wherein said virtual machine monitoring further comprises implementing basic synchronization and communication mechanisms between virtual machines, and partitions system resources between them.

12. A processor system, configured for operating a process for managing virtual machines in a physical processing machine comprising the operations of generating virtual machines and unmodified executing guest operating systems in said virtual machines of said physical machine, wherein said process comprises:

providing a virtual machine monitoring function running on said physical machine, said virtual machine monitoring function including the operations of:

running in privileged mode;

operating multiprogramming functions;

providing a plurality of said virtual machines identical to said physical machine executing said unmodified guest operating systems;

providing said physical machine with privileged instruction traps that do not alter a state of said physical machine, comprising:

allowing all privileged instructions to generate a trap when executed in unprivileged mode;

restricting the use of unprivileged instructions depending on whether a portion of the state of the physical machine belongs to a privileged state view of the physical machine for its outcome; and allowing the physical machine to relocate its exception vector table anywhere in the addressing space in order to allow said virtual machine monitoring to intercept all traps generated by the physical machine by defining a privileged register, in particular a trap table base register that, at each instant, holds the virtual base address of said exception vector table.

13. The processor system according to claim 12, wherein said virtual machine monitoring comprises intercepting and redirecting to said guest operating system running in a respective virtual machine system call instructions from application programs.

14. The processor system according to claim 13, wherein said virtual machine monitoring comprises performing an emulation procedure when executing a privileged instruction in physical unprivileged mode so that said guest operating system operates as if running in privileged mode and said physical machine operates in user mode.

15. A non-transitory computer-readable storage medium tangibly embodying a computer program product directly loadable in the memory of and executable by a digital computer comprising a program of instructions for performing a process when the product is run on the computer for managing virtual machines in a physical processing machine, the program of instructions comprising the operations of generating virtual machines and executing unmodified guest operating systems in said virtual machines of said physical machine, said product comprising:

program code for providing a virtual machine monitoring function running on said physical machine, said virtual machine monitoring function including the operations of:

program code for running in privileged mode;

program code for operating multiprogramming functions;

program code for providing a plurality of said virtual machines identical to said physical machine executing said unmodified guest operating systems;

program code for providing said physical machine with privileged instruction traps that do not alter a state of said physical machine, comprising:

program code for allowing all privileged instructions to generate a trap when executed in unprivileged mode;

program code for restricting the use of unprivileged instructions depending on whether a portion of the state of the physical machine belongs to a privileged state view of the physical machine for its outcome; and program code for allowing the physical machine to relocate its exception vector table anywhere in the addressing space in order to allow said virtual machine monitoring to intercept all traps generated by the physical machine by defining a privileged register, in particular a trap table base register that, at each instant, holds the virtual base address of said exception vector table.

16. The computer-readable storage medium according to claim 15, wherein said virtual machine monitoring comprises intercepting and redirecting to said guest operating system running in a respective virtual machine system call instructions from application programs.

17. The computer-readable storage medium according to claim 16, wherein said virtual machine monitoring comprises performing an emulation procedure when executing a privileged instruction in physical unprivileged mode so that said guest operating system operates as if running in privileged mode and said physical machine operates in user mode.

* * * * *